United States Patent [19]

Kalinichenko et al.

[11] 4,195,236
[45] Mar. 25, 1980

[54] DEVICE FOR DISCRETE CONTROL OF THYRISTOR-PULSE CONVERTERS

[75] Inventors: Anatoly Y. Kalinichenko; Viktor I. Kirillov; Aron A. Rabinovich; Vladimir V. Maleev; Vagiz S. Sakaev, all of Moscow, U.S.S.R.

[73] Assignee: Vsesojuzny Nauchno-Issledovatelsky Institut Vagonostroenia, Moscow, U.S.S.R.

[21] Appl. No.: 889,411

[22] Filed: Mar. 23, 1978

[51] Int. Cl.² .......................................... H03K 17/72
[52] U.S. Cl. ................................ 307/252 K; 307/269; 318/139; 363/124
[58] Field of Search ................... 307/25 Z, 25 R, 25 J, 307/25 K, 269; 363/124; 318/139

[56] References Cited
U.S. PATENT DOCUMENTS 3,764,890  10/1973  Caen ................................. 307/269 X

*Primary Examiner*—John Zazworsky
*Attorney, Agent, or Firm*—Lackenbach, Lilling & Siegel

[57] ABSTRACT

The proposed device comprises a master pulse generator and a control unit. The master pulse generator is connected to a clock pulse counter coupled to a thyristor-pulse converter. The control unit is connected to a bidirectional pulse counter. The proposed device also comprises a decoder whose inputs are connected to the clock pulse counter and to the bidirectional pulse counter; an individual AND gate whose input is connected to the clock pulse counter and whose output is connected to a second thyristor-pulse converter; and two groups of AND gates, each AND gate having an input connected to the decoder. The proposed device also has a NOT gate whose input is connected to the decoder; a sign flip-flop whose first output is connected to the AND gates of one of said groups and whose other output is connected to the first individual AND gate, to the AND gates of the other of said groups, and to the bidirectional pulse counter. Furthermore, the device is provided with a second individual AND gate whose inputs are connected to the NOT gate and to the bidirectional pulse counter and whose output is connected to the sign flip-flop; a third individual AND gate whose inputs are connected to the control unit and to the bidirectional pulse counter and whose output is connected to the sign flip-flop; and a fourth individual AND gate whose inputs are connected to the control unit, to the bidirectional pulse counter and whose output is connected to the sign flip-flop. The proposed device also includes a circuit for passing time-shifted trains of control pulses fed from the decoder to the thyristor-pulse converters.

1 Claim, 1 Drawing Figure

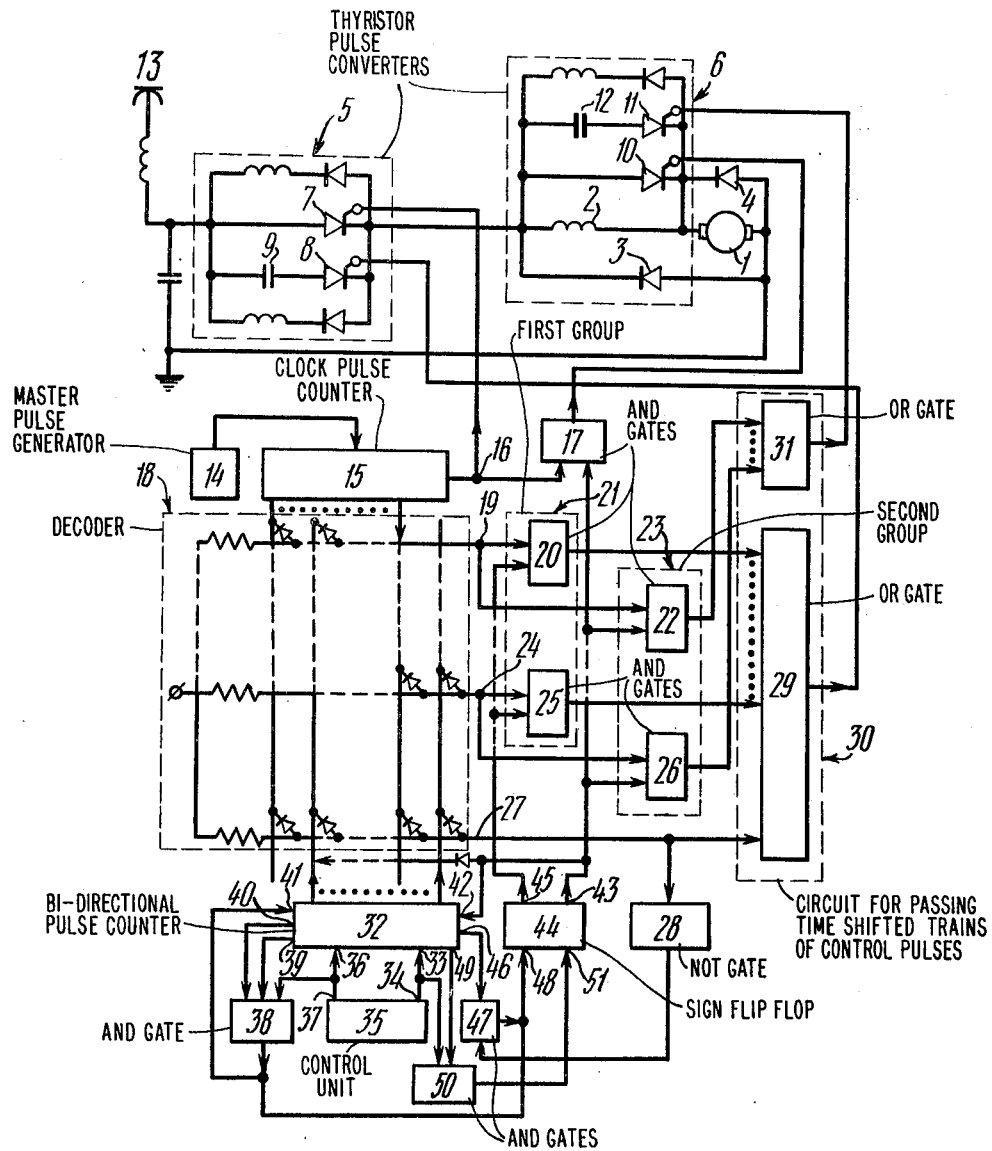

DEVICE FOR DISCRETE CONTROL OF THYRISTOR-PULSE CONVERTERS

FIELD OF THE INVENTION

The present invention relates to systems for controlling thyristor-pulse-width d-c converters and, more particularly, to devices for discrete control of pulse-width converters.

The present invention will find application in metallurgy, the ship-building industry, the textile industry, electric traction systems for municipal and industrial vehicles, and in systems for controlling the traction and braking forces in intercity electric trains.

BACKGROUND OF THE INVENTION

Well known in the art are devices for discrete control of pulse-width converters (cf. USSR Inventor's Certificate No. 394,907; Cl. H02 p 13/16), which include a master oscillator connected to a clock pulse counter and a control unit connected to a bidirectional pulse counter. These devices also include a decoder connected to the clock pulse counter and bidirectional pulse counter. These devices make it possible to control a two-stage thyristor-pulse converter while changing and switching mode in the process of changing the duration of the output voltage pulse. However, such a device cannot provide simultaneous control of two thyristor-pulse converters.

Also known in the art is a device for discrete control of thyristor-pulse converters (cf. USSR Inventor's Certificate No. 366,540, Cl. H02 p 13/16) comprising a master oscillator, a control unit, and a clock pulse counter having logic outputs in number to the doubled number of digits. The complementing input of the clock pulse counter is connected to the input of the master oscillator. The control input of the clock pulse counter is connected to the switching thyristors of a pulse-width converter. The device also includes a bidirectional pulse counter having logic outputs in number to the doubled number of digits. The number of digits is equal to that of the clock pulse counter whose adding and subtracting inputs are connected, respectively, to the add and subtract outputs of the control unit. This device also includes a decoder for matching the operation of the clock pulse counter and the bidirectional pulse counter and having its inputs connected to the logic outputs of the clock pulse counter and the bidirectional pulse counter. In addition, the device is provided with a circuit for passing time-shifted trains of control pulses fed from the coutput buses of the decoder to the power thyristor of one pulse-width converter.

However, in order to control two thyristor-pulse converters, e.g., a voltage changer and a field regulator, the known device required two control systems of this type, which results in a considerable increase in size, cost, and power consumption, as well as in poorer reliability of the device.

SUMMARY OF THE INVENTION

An object of the present invention is to simplify the device for discrete control of thyristor-pulse converters, to improve its reliability and to reduce the weight size, cost and consumed power.

This object is attained by providing a device for discrete control of thyristor-pulse converters, comprising a master pulse generator, a control unit; a clock pulse counter whose complementing input is connected to the output of the master generator and whose control output is connected to the switching thyristor of one of the thyristor-pulse converters; a bidirectional pulse counter whose add and subtract inputs are connected to the add and subtract outputs of the control unit; and a decoder for matching the operation of the clock pulse counter and the bidirectional pulse counter. The inputs of this decoder are connected to the logic outputs of the clock pulse counter and to the logical outputs of the bidirectional pulse counter, the number of these outputs being equal to each other and to a doubled number of digits. A circuit for passing the time-shifted trains of control pulses fed from the output buses of the decoder to the power thyristors of the thyristor-pulse converter includes at least one OR gate. According to the invention, the device also comprises an individual AND gate whose input is connected to the control output of the clock pulse counter and where output is connected to the switching thyristor of a second thyristor-pulse converter. Two groups of AND gates are provided, wherein the number of AND gates in the group is determined by the number of digits of the clock and bidirectional pulse counters and by the required range of control of the output parameter of the thyristor-pulse converters. The inputs of each gate are connected to respective output buses of the decoder determining the pulse duration, and the outputs of each gate are connected to respective OR gates of the circuit for passing the time-shifted trains of control pulses. A NOT gate has an input connected to the output bus of the decoder determining the maximum pulse duration. A sign flip-flop has a first output connected to the other inputs of the AND gates of one group and a second output connected to the other input of the individual AND gate, to the other inputs of the AND gates of the second group, to the reset input of the bidirectional pulse counter receiving a reset signal, and to the logic outputs of the bidirectional pulse counter determining the maximum pulse duration. A second individual AND gate, has an input connected to the output of the NOT gate, another input is connected to the output of the bidirectional pulse counter producing a control start signal, and an output connected to the first input of the sign flip-flop. A third individual AND gate has an input connected to the add output of the control unit, another input connected to the output of the bidirectional pulse counter producing a signal indicative of the bidirectional pulse counter being filled, and an output connected to the second input of the sign flip-flop. A fourth individual AND gate, has an input is connected to the subtract output of the control unit, another input connected to the output of the bidirectional pulse counter producing a signal at the first step of control, a third input connected to the output of the bidirectional pulse counter producing a signal describing the condition of the bidirectional pulse counter, corresponding to the maximum duration of the pulse of the output parameter of one of the thyristor-pulse converters, and an output connected to the first input of the sign flip-flop and to the input of the bidirectional pulse counter through which is supplied a signal setting the bidirectional pulse counter to its final state.

Such an embodiment of the control device makes it possible to control two thyristor-pulse converters, e.g., voltage changers, to a rated load voltage, then to control two voltage changers with a fixed filling factor and controlling the exciter winding field regulator.

BRIEF DESCRIPTION OF THE DRAWING

Other objects and advantages of the present invention will be understood from the following detailed description of a preferred embodiment thereof with reference to the accompanying drawing which is a block diagram of the proposed for discrete control of thyristor-pulse converters.

DETAILED DESCRIPTION OF THE INVENTION

The drawing shows a system for controlling two thyristor-pulse converters comprising a motor 1 with a series field winding 2 shunted with backward diodes 3 and 4. The voltage at the motor 1 and the field winding 2 is controlled by means of a thyristor-pulse converter 5, while the current through the series field winding 2 is controlled by means of another thyristor-pulse converter 6 serving as a thyristor-pulse field regulator. The thyristor-pulse converter 5 comprises a main thyristor 7 shunted with a switching thyristor 8 and a switching capacitor 9, which are connected in series. The thyristor-pulse converter 6, connected in parallel with the series field winding 2, comprises a main thyristor 10 shunted with a switching thyristor 11 and a switching capacitor 12. The motor 1 is fed with direct current from a contact network 13.

The device for discrete control of thyristor-pulse converters includes a master pulse generator 14 made in the form of a relaxation oscillator. The output of the pulse generator 14 is connected to the complementing input of a clock pulse counter 15. The clock pulse counter 15 has a control output 16 connected to the control electrode of the main thyristor 7 of the thyristor-pulse converter 5 and to one of the inputs of an individual AND gate 17. The output of the individual AND gate 17 is connected to the control electrode of the main thyristor 10 of the thyristor-pulse converter 6. The device for discrete control with thyristor-pulse converters also comprises a decoder 18 made in the form of a dual matrix. The inputs of the decoder 18 are connected to the logic outputs of the clock pulse counter 15, the number of pulses being equal to twice the number of digits. The decoder 18 has an output bus 19 which produces a signal determining the initial pulse duration. The output bus 19 of the decoder 18 is connected to an input of an AND gate 20 of a first group 21 of AND gates and to an input of an AND gate 22 of a second group 23 of AND gates. The decoder 18 also has an output bus 24 which forms a signal determining the penultimate value of the pulse duration. The output bus 24 is connected to an input of an AND gate 25 of the first group 21 of AND gates and to an input of an AND gate 26 of the second group 23 of AND gates. The decoder 18 also has an output bus 27 producing a signal determining the maximum value of the pulse duration of the thyristor-pulse converter 5. The output bus 27 is connected to the input of a logical NOT gate 28 and to the input of an OR gate 29 of a circuit 30 for passing time-shifted trains of control pulses. In this case, the circuit 30 includes two OR gates 29 and 31. The inputs of the OR gate 29 of the circuit 30 are connected to the outputs of the AND gates 20 and 25 of the first group 21, and the output is connected to the control electrode of the switching thyristor 8 of the thyristor-pulse converter 5. The inputs of the OR gate 31 of the circuit 30 are connected to the outputs of the AND gates 22 and 26 of the second group 23, and the output is connected to the control electrode of the switching thyristor 11 of the thyristor-pulse converter 6.

Instead of the above-described connection of the thyristors of the thyristor-pulse converters 5 and 6, the control electrode of the main thyristor 7 can be connected to the output of the OR gate 29, the control electrode of the switching thyristor 8 can be connected to the output 16 of the clock pulse counter 15, the control electrode of the main thyristor 10 can be connected to the output of the OR gate 31, and the control electrode of the thyristor 11 can be connected to the output of the AND gate 17. Such a modification does not affect the operation of the control system and does not disturb the algorithm of operation of the converters 5 and 6.

The device for discrete control of thyristor-pulse converters also includes a bidirectional pulse counter 32, the number of digits of which being equal to that of the clock pulse counter 15. The bidirectional pulse counter 32 has logic, for a double number of digits, connected to the inputs of the decoder 18 which matches the operation of the clock pulse counter 15 and the bidirectional pulse counter 32. The bidirectional pulse counter 32 has an add input 33 connected to the add output 34 of a control unit 35. The control unit 35 comprises a relaxation oscillator, transducers and a diode matrix. Furthermore, the bidirectional pulse counter 32 has a subtract input 36 connected to a subtract output 37 of the control unit 35. The subtract output 37 of the control unit 35 is also connected to one of the inputs of an AND gate 38. A second input of the AND gate 38 is connected to an output 39 of the bidirectional pulse counter 32 producing a signal at the first control phase. The third input of the AND gate 38 is connected to an output 40 of the bidirectional pulse counter 32, which produces a signal indicating the state of the bidirectional counter 32, corresponding to the maximum pulse duration of the output parameter of one thyristor-pulse converter 5. The output of the AND gate 38 is connected to the input 41 of the bidirectional pulse counter 32, thorough which a signal is sent which sets the bidirectional pulse counter to its final state. A reset input 42 of the bidirectional pulse counter 32, receiving a signal for resetting the bidirectional pulse counter 32 and the logic outputs of the bidirectional pulse counter 32 producing a signal determining the maximum pulse duration of the thyristor-pulse converter 5, is connected to an output 43 of a sign flip-flop 44. The output 43 of the sign flip-flop 44 is also connected to the second inputs of the individual AND the gate 17 and AND gates 22 and 26 of the second group 23. A second output 45 of the sign flip-flop 44 is connected to the other inputs of the AND gates 20 and 25 of the first group 21. An output 46 of the bidirectional pulse counter 32, which produces a control start signal, is connected to an input of an individual AND gate 47. The other input of the AND gate 47 is connected to the output of the NOT gate 28. The output of the AND gate 47 is connected to an input 48 of the sign flip-flop 44. An output 49 of the bidirectional pulse counter 32, which produces a signal indivative of the maximum pulse duration being attained, is connected to one of the inputs of an individual AND gate 50. The other input of the AND gate 50 is connected to the add input 34 of the control unit 35, and the output is connected to another input 51 of the sign flip-flop 44.

The proposed device for discrete control of thyristor-pulse converters operates as follows.

The main thyristor 7 is rendered conducting for supplying voltage from the d-c source 13 to the motor 1. After the main thyristor 7 is rendered nonconducting, the switching thyristor 8 is thrown into conduction. As a result, a back voltage of the switching capacitor 9 is applied to the main thyristor 7. During the pause, after the main thyristor 7 has been rendered nonconducting, the current in the field winding 2 and the armature of motor 1 is maintained through the backward diode 3 due to the electromagnetic energy stored in the inductors of the motor 1 and in the winding 2 during the pulse. By increasing the duration of the conductive state of the main thyristor 7, it is possible to increase the voltage at the motor 1. The filling factor is fixed upon reaching the rated voltage of the motor 1. A (The filling factor is the ratio of the pulse duration to the period of repeating the pulse.) further increase in the speed of the motor 1 is provided due to the reduction of the field of the winding 2, by switching on the thyristor-pulse converter 6. When the main thyristor 10 is switched on, a portion of the power current flows through the main thyristor 10, bypassing the field winding 2 and thus reducing the flux. During the pause, when the main thyristor 10 is rendered nonconducting by the switching thyristor 11, the current flows through the backward diodes 3 and 4.

By increasing the duration of the conductive state of the main thyristor 10, the attenuation factor of the field is increased; the maximum value of this factor is determined by the restrictions imposed on the conditions of motor switching.

The clock pulses from the master generator 14 are fed to the complementing input of the clock pulse counter 15 at a frequency determined by the frequency of operation of the thyristors 7 and 8 of the converter 5, the thyristors 10 and 11 of the converter 6, and the number of flip-flops in the clock and bidirectional pulse counters 15 and 32.

The clock pulses fed to the clock pulse counter 15 change the state of its flip-flops. The time-constant pulses from the output 16 of the clock pulse counter 15 are fed to the main thyristor 7 of the thyristor-pulse converter 5.

At the same time, the decoder 18 receives codes from the logic outputs of the clock pulse counter 15. At the beginning of the control operation, a signal from the output 46 of the bidirectional pulse counter 32 is fed to one input of the individual AND gate 47. The other input of the AND gate 47 is fed with a signal from the NOT gate 28, because no signal is present at the input of the NOT gate 28 at the beginning of control. The coinciding signals from the output of the AND gate 47 are fed to the input 48 of the sign flip-flop 44, bringing this flip-flop to a steady state at which a signal appears at the output 45 of the sign flip-flop 44. The signal from the output 45 of the sign flip-flop 44 is fed to an input of each of the AND gates 20 and 25 of the first group 21 of AND gates.

When a single pulse from the add output 34 of the control unit 35 is fed to the add input 33 of the bidirectional pulse counter 32, the flip-flops of the bidirectional pulse counter 32 assume the first state. In this state, a binary code produced by the logic outputs of the bidirectional pulse counter is applied to the decoder 18. If the states of the flip-flops of the clock pulse counter 15 coincide with those of the flip-flops of the bidirectional pulse counter 32, pulses appear at the output 19 of the decoder 18, these pulses having a frequency of operation of the thyristor 8 of the converter 5. The pulses generated at the output 19 of the decoder 18 are shifted with respect to respective pulses appearing at the control output 16 of the clock pulse counter 15 by a value equal to the discreteness of quantization of the period of switching of the thyristors 7 and 8 of the converter 5.

The pulses fed to the input of the AND gate 20 of the first group 21 pass from the output of the AND gate 20 to the OR gate 29. From the output of the OR gate 29, the pulses are fed to the switching thyristor 8 of the thyristor-pulse converter 5. The control pulses are not fed to the thyristors of the thyristor-pulse converter 6, since no potential signal appears at the output 43 of the sign flip-flop 44. The second pulse fed from the control unit 35 to the add input 33 of the bidirectional counter 32 changes the states of the flip-flops of the bidirectional pulse counter 32. When the states of the flip-flops of the clock pulse counter 15 coincide with that of the flip-flops of the bidirectional pulse counter 32, the pulses sent from the decoder 18 are shifted by a double value equal to the discreteness of quantization of the period of switching the thyristors 7 and 8 of the thyristor-pulse converter 5, relative to the pulses sent from the control output 16 of the lock pulse counter 15.

As the pulses from the control unit 35 are supplied to the add input 33 of the bidirectional pulse counter 32, the time shift between the pulses fed from the output 16 of the clock pulse counter 15 and the pulses fed from one of the outputs of the decoder 18 corresponding to a given step of control is increased.

The supply of the pulse corresponding to the last step of control to the bidirectional pulse counter 32 results in pulses appearing at the output bus 27 of the decoder 18. From the output 27 the pulses are fed to the OR gate 29 and to the NOT gate 28. In this case, the output signal of the NOT gate 28 disappears causing disappearance of the potential signal at one input of the individual AND gate 47. At the same time, the potential signal from the output 49 of the bidirectional pulse counter 32 is fed to an input of the individual AND gate 50.

When a regular pulse is fed to the complementing input 33 of the bidirectional pulse counter 32 from the control unit 35, this signal passes to the individual AND gate 50. From the output of the individual AND gate 50, the signal is fed to the input 51 of the sign flip-flop 44, which passes to its other steady state. In this case, the signal at the output 45 of the flip-flop 44 disappears and a signal appears at its separate output 43. From the output 43 of the sign flip-flop 44, the potential signal is fed to one input of the individual AND gate 17 and each of the AND gates 22 and 26 of the second group 23 of AND gates. At the same time, the signal from the output 43 of the sign flip-flop 44 is fed to the logic outputs of the bidirectional pulse counter 32 to provide pulses at the output 27 of the decoder 18 and is also fed to the reset input 42 of the bidirectional pulse counter 32 to bring the bidirectional pulse counter 32 to its initial state.

However, the pulses still remain at the last output 27 of the decoder 18, since a potential signal from the output 43 of the sign flip-flop 44 is fed to the logic outputs of the bidirectional pulse counter 32.

Thus, the filling factor of the thyristor-pulse converter 5, which corresponds to the rated operating conditions, is fixed.

After that the thyristor-pulse converter 6 is put into operation. The pulses from the output of the individual AND gate 17 are fed to the main thyristor 10. In this case, one input of the AND gate 17 is fed with pulses from the output 16 of the clock pulse counter 15, and the other input is fed with a potential signal from the output 43 of the sign flip-flop 44. When one pulse from the control unit 35 is applied to the add input 33 of the bidirectional pulse counter 32, at the output 19 of the decoder 18 there are produced pulses shifted with respect to those sent from the output 16 of the clock counter 15 by a value equal to the discreteness of quantization of the period of switching the thyristors 10 and 11 of the thyristor-pulse converter 6. The pulses from the output 19 of the decoder 18 are fed to one input of the AND gate 22 whose other input receives a potential signal from the output 43 of the sign flip-flop 44. The pulses from the output of the AND gate 22 are fed to the OR gate 31. The control pulses from the output of the OR gate 31 are fed to the switching thyristor 11 of the thyristor-pulse converter 6. As the signals arrive at the complementing input 33 of the bidirectional pulse counter 32, the duration of the pulse of the thyristor-pulse converter 6 is successively increased. The appearance of pulses at the output 24 of the decoder 18 corresponds to the maximum field attenuation factor being achieved.

The pulses from the output 24 of the decoder 18 are fed to the input of the AND gate 26 whose other input is fed with a signal from the output 43 of the sign flip-flop 44.

When the pulses from the control unit 35 are fed to the subtract input 36 of the bidirectional counter 32, the states of the flip-flops of the bidirectional pulse counter 32 are changed. In this case, a subtraction operation is executed, i.e., when one pulse is applied to the subtract input 36, the time shift between the pulses sent from the outputs of the decoder 18 and from the output 16 of the clock pulse counter 15 fed through the AND gate 17 to the main thyristor 10 of the thyristor-pulse converter 6 is reduced by a value equal to the discreteness of quantization of the period of switching of the thyristors 10 and 11 of the thyristor-pulse converter 6. As the pulses from the control unit 35 are applied to the subtract input 36 of the bidirectional pulse counter 32, this shift is reduced. The minimum filling factor of the thyristor-pulse converter 6 is established when pulses appear at the first output 19 of the decoder 18. In this case, a signal from the output 39 of the bidirectional pulse counter 32 is fed to one input of the AND gate 38. The other input of the AND gate 38 receives a signal from the output 40 of the bidirectional pulse counter 32, because in this moment there are signals at the last output 27 of the decoder 18. The third input of the AND gate 38 receives a pulse from the subtract output 37 of the control unit 35. When the pulse from the subtract output 37 of the control unit 35 is fed to the AND gate 38, the signal from the output of the AND gate 38 passes to the input 48 of the sign flip-flop 44 and to the input 41 of the bidirectional pulse counter 32. This signal transfers the bidirectional pulse counter 32 to a state corresponding to the maximum at which pulses appear at the output 27 of the decoder 18. When a regular pulse is fed to the input 48 of the sign flip-flop 44, the flip-flop 44 is reversed to the other steady state at which the potential signal disappears at the output 43 and appears at the separate output 45. In this case, the thyristor-pulse converter 6 is switched off.

When a second pulse is fed to the subtract input 36 of the bidirectional counter 32, the flip-flops of the bidirectional pulse counter 32 assume a state, which, when in coincidence with the state of the flip-flops of the clock pulse counter 15, results in the appearance of pulses at the output 24 of the decoder 18. The pulses from the output 24 of the decoder 18 are fed to the AND gate 25 of the first group 21. From the output of the AND gate 25, the pulses pass to the AND gate 29 of the circuit 30, then to the switching thyristor 8 of the thyristor-pulse converter 5. There are no signals at the output 27 of the decoder 18.

As the signals from the control unit 35 are supplied to the bidirectional pulse counter 32, the subtract input 36 provides a decrease in the time shift between the pulses sent from the output 16 of the clock pulse counter 15 and the pulses sent from the output of the OR gate 29 of the circuit 30.

Thus, the proposed device for discrete control of thyristor-pulse converters makes it possible to provide simultaneous control of two thyristor-pulse converters 5 and 6, one of which, for example, operates as a thyristor-pulse voltage changer while the other operates as a thyristor-pulse field regulator. In the case, a single bidirectional pulse counter 32 and a single decoder 18 are used, which improves its operational reliability and efficiency and decreases its size, weight and consumed power.

What is claimed is:

1. A device for discrete control of thyristor-pulse converters, each converter comprising power thyristors, comprising:

a master pulse generator having an output;

a control unit having an add output and a subtract output;

a clock pulse counter having a complementing input, a control output and a plurality of logic outputs whose number is equal to twice the number of digits, the complementing input of said clock pulse counter being connected to the output of said master generator, and the control input being connected to the power thyristor of one of said thyristor-pulse converters;

a bidirectional pulse counter having an add input, a subtract input, a reset input receiving a signal resetting the bidirectional pulse counter, a setting input receiving a signal setting the bidirectional pulse counter to its final state, a first output producing a signal at the first control phase, a second output producing a control start signal, a third output producing a signal indicative of the maximum pulse duration being attained, a fourth output producing a signal indicative of the state of the bidirectional pulse counter, corresponding to the maximum pulse duration of the output parameter of one of said thyristor-pulse converters, and a plurality of logic outputs whose number is equal to the number of logic outputs of said clock pulse counter and is equal to twice the number of digits, said bidirectional pulse counter being connected through said add input and said subtract input to the add output and the subtract output of said control unit, respectively;

a decoder matching the operation of said clock pulse counter and said bidirectional pulse counter, and having a plurality of inputs, a first output bus producing a signal determining the initial pulse duration, a second output bus producing a signal determining the penultimate value of the pulse duration, and a third output bus producing a signal determining the maximum pulse duration, said decoder being connected through said inputs to the logic outputs of said clock pulse counter and to the logic outputs of said bidirectional pulse counter;

a first individual AND gate having a first input, a second input and an output, and being connected through its first input to the control output of said clock pulse counter and connected through its output to said power thyristor of a second thyristor-pulse converter;

first and second groups of AND gates, the number of AND gates in each group being determined by the number of digits of said clock pulse counter and said bidirectional pulse counter and by the reuired control range of the output parameter of said thyristor-pulse converters, each AND gate of said groups having a first input, a second input and an output, said first input being connected to said first output bus of said decoder;

a NOT gate having an input and an output, said input being connected to the third output bus of said decoder;

a sign flip-flop having a first input, a second input, a first output and a second output, the first output of said sign flip-flop being connected to the second inputs of said AND gates of the first group, the second output being connected to the second input of said first individual AND gate, to the second inputs of said AND gates of the second group, and to the reset input of said bidirectional pulse count;

a second individual AND gate having a first input, a second input and an output, the first input being connected to the output of said NOT gate, the second input being connected to the second output of said bidirectional pulse counter, and the output being connected to the first input of said sign flip-flop;

a third individual AND gate having a first input, a second input and an output, the first input being connected to the add output of said control unit, the second input being connected to the third output of said bidirectional pulse counter, and the output of said third AND gate being connected to the second input of said sign flip-flop;

a fourth individual AND gate having a first input, a second input, a third input, and an output, the first input of said fourth AND gate being connected to the subtract output of said control unit, the second input being connected to the first output of said bidirectional pulse counter, the third input being connected to said fourth output of said bidirectional pulse counter, and the output being connected to the first input of said sign flip-flop and to the setting input of said bidirectional pulse counter; and a circuit for passing the time-shifted trains of control pulses fed from the output buses of said decoder to the power thyristors of said thyristor-pulse converters, said circuit including at lease one OR gate, each OR gate of said circuit having inputs, the number of inputs being equal to the number of AND gates in said groups, each said OR gate of said circuit being connected through said inputs to the outputs of said AND gates of one of said groups and being connected through an output to said power thyristor of one of said thyristor-pulse converters.

* * * * *